United States Patent Office 3,597,251
Patented Aug. 3, 1971

3,597,251
CALCIUM CARBONATE PRODUCT
Daniel Kaufman, Grosse Ile, Mich., assignor to Wyandotte Chemicals Corporation, Wyandotte, Mich.
No Drawing. Filed Nov. 19, 1968, Ser. No. 777,181
Int. Cl. C09c 1/02
U.S. Cl. 106—306
14 Claims

ABSTRACT OF THE DISCLOSURE

Preparation of an aqueous calcium carbonate slurry characterized by high stability, high solids content, and low viscosity by incorporating in such slurry about 0.05 to 0.5% by weight of either substantially pure zinc oxide or zirconium oxide or mixture of both.

---

Inorganic paper coatings are compositions of pigments and adhesives, suspended in water, which are applied to one or both sides of paper by special apparatus to make it more suitable for printing or to improve its decorative quality.

The pigments which can be employed in inorganic coating formulations include, for example, white minerals such as clay, barites, talc and ground limestone; colored pigments such as ultramarine, umber, siennas, ochers and lakes; powdered metals such as tin, zinc, bronze and aluminum; and synthetic pigments such as titanium dioxide, satin white, blanc fixe and precipitated calcium carbonate.

The coating colors, whether for use in the conversion process or in the on-machine coating method, are, in general, thixotropic and tend to set rigidly upon being applied to the surface of the paper. After the coating color has been applied to the paper, the paper is dried in a suitable manner wherein the water from the coating formulation is evaporated. A critical feature of each coating formulation is therefore the ratio of solids to water. Thus, a high solids content is particularly desirable in order to reduce the amount of water which must be evaporated. A reduction in the water content of the coating color is of further significance in that it reduces the cost of the coating step as well as permitting a more rapid coating operation. Although a high solids-low water ratio is particularly advantageous in a paper-coating formulation, the formulation must be flowable. The viscosity of the coating color must be low enough so that it can be handled easily with respect to pumping, flow and ease of application onto the paper.

Precipitated calcium carbonate is one of the principal synthetic pigments employed in paper coatings. For the above reasons, there is a significant advantage to a high solids, low viscosity slurry of calcium carbonate which can be subsequently blended with an adhesive and other suitable adjuncts so as to provide a high solids paper coating having a low viscosity.

It has been found that one particular calcitic calcium carbonate is especially suitable for this purpose. This calcium carbonate is characterized in that it is a finely divided, relatively nonaggregated calcium carbonate having an apparent particle size within the range of about 0.05–0.30 micron as determined by electron micrographs and can be prepared in accordance with the method set forth in U.S. Pat. No. 2,964,382, G. E. Hall. In accordance with the disclosure of Hall, finely divided, nonaggregated crystals of calcitic calcium carbonate can be prepared by gradually contacting calcium ions with carbonate ions in an aqueous medium at a pH of at least about 8.5, and in the presence of anti-compositing forces of sufficient intensity and magnitude to establish and maintain substantially all of the crystals of calcium carbonate resulting from the contacting step in a completely segregated condition. The resulting calcium carbonate slurry is removed from the reaction zone, filtered, the filter cake washed to essentially salt-free condition, dried, and then crushed. Prior to drying, a typical filter cake generally contains about 45 to 50% solids. In general, the dried calcium carbonate is shipped by the calcium carbonate manufacturer to the paper mill or other user of calcium carbonate who prepares a slurry thereof for paper-coating purposes or any use for which a slurry is needed.

Suitable high solids, calcitic calcium carbonate slurries for paper-coating purposes generally contain from about 55 to 80% calcium carbonate in an aqueous slurry. In order to have a suitable initial low viscosity, from about 0.3 to 2.0% by weight of a complex phosphate-type dispersant material is generally included in such slurries with the balance of the slurry being substantially all water and impurities in normal amounts. The preparation of calcium carbonate slurries employing a complex phosphate-type dispersant material is disclosed in U.S. Pat. No. 2,750,299.

However, it is desirable to be able to further improve the dispersion of the calcium carbonate pigment over that achieved with the conventional prior art dispersants, such as disclosed in U.S. Pat. No. 2,750,299 in order to achieve faster dispersing rates with resulting economic and other advantages.

Accordingly, it is a purpose of the instant invention to prepare an aqueous calcium carbonate slurry characterized by high stability, high solids content, and low viscosity wherein the dispersion of the calcium carbonate may be achieved at a faster rate and wherein improved rheologies may be obtained.

In accordance with the instant invention, it has been found that dispersion of calcium carbonate in an aqueous slurry may be greatly improved by incorporating in the slurry a compound selected from the group consisting of zinc oxide and zirconium oxide, preferably in the amount of from about 0.05 to 0.5% by weight.

Thus, the instant invention relates to a method for preparing an aqueous calcium carbonate slurry comprising mixing calcium carbonate and water with from about 0.05 to 0.5% by weight of a compound selected from the group consisting of substantially pure zinc oxide and zirconium oxide. Zinc oxide and/or zirconium oxide may be incorporated in the slurry in addition to conventional dispersants, such as that disclosed in U.S. Pat. No. 2,750,299, whereby the dispersing action is greatly improved. Good results are achieved with calcium carbonate slurries wherein from about 0.2 to 2.0% by weight complex phosphate dispersant material containing from about 50 to 100% by weight complex phosphate is mixed with calcium carbonate and water.

It has also been found in accordance with this invention that greatly improved results are achieved by also mixing an organic polymer with the calcium carbonate and water. The organic polymer may have a molecular weight from about 1,000 to 90,000. In a preferred embodiment of the invention employing the organic polymer, the slurry contains from about 0.05 to 0.5% by weight zinc oxide and/or zirconium oxide, from about 0.2 to 2.0% by weight complex phosphate material and from about 0.05 to 1.5% by weight organic polymer.

The "calcium carbonate" dispersed in accordance with this invention is generally a finely divided, relatively non-aggregated calcium carbonate which has an apparent particle size within the range of about 0.05–0.30 micron as determined by electron micrographs. In a preferred form, at least about one-half of the calcium carbonate particles have an apparent particle size within the range of about 0.10–0.20 micron as determined from electron micrographs. Such calcium carbonate may be prepared in accordance with the method disclosed by Hall U.S. 2,964,382.

Examples of suitable complex phosphate dispersant materials which may be employed in accordance with this invention are sodium hexametaphosphate, disodium phosphate, monosodium orthophosphate, dipotassium phosphate, sodium pyrophosphate, sodium tripolyphosphate, starch phosphate, tetrapotassium pyrophoshate, tetrasodium pyrophosphate, trisodium phosphate, zinc phosphate, and zinc pyrophosphate.

A preferred complex phosphate material which can be effectively employed in the method of the invention is essentially a three-phase, homogeneous fused product comprising from about 81 to 88% by weight of sodium phosphate glass having a molar ratio of sodium oxide to phosphorus pentoxide from about 0.9:1 to about 1.5:1, from about 10 to 15% by weight of zinc oxide and from about 0.5 to 8.0% by weight of a compound selected from the group consisting of the salt and hydroxide of an alkali metal selected from the group consisting of potassium and lithium. The preferred sodium phosphate glass is modified sodium hexametaphosphate which has a molar ratio of sodium oxide to phosphoric pentoxide of 1.1:1. The potassium and lithium salts which can be fused into, or mechanically admixed with, a sodium metaphosphate-zinc oxide glass in order to prepare suitable dispersants include, for example, lithium or potassium metaphosphate or lithium or potassium carbonate. A preferred complex phosphate dispersant material contains 83.5% by weight of sodium hexametaphosphate, about 11.5% by weight of zinc oxide, and about 5% by weight of potassium metaphosphate. Dispersants containing the above ingredients in the proportions set forth are marketed under the trademark Calgon T and are more fully described in U.S. Pat. No. 2,750,299—G. D. Hansen Jr.

Preferred organic polymers which may be employed in this invention are alkali metal polyacrylate polymers, particularly those of sodium and potassium, and ethylene-maleic anhydride copolymers.

While slurries produced as set forth above are satisfactory, it is often desirable for the paper mill or other user of the calcium carbonate pigment to be able to simply mix the calcium carbonate product with water to produce the slurry. For such applications, predispersed dry calcium carbonate pigments which may be easily mixed with water to form slurries suitable for paper coating and other applications are prepared by mixing calcium carbonate and water with from about 0.05 to 0.5% by weight of a compound selected from the group consisting of substantially pure zinc oxide and/or zirconium oxide, and from about 0.2 to 2.0% by weight complex phosphate dispersant material containing from about 50 to 100% by weight complex phosphate, and drying said mixture.

In a commercial process for preparing such predispersed slurries, calcium carbonate filter cake is employed which generally contains about 40 to 50% solids. In such case, dry, recycled calcium carbonate pigment is added to give a slurry having about 75% by weight solids. However, the total amount of calcium carbonate in the slurry is still 70 to 80 weight percent. As in the previous embodiments of this invention, from about 0.05 to 1.5% by weight organic polymer, as described above, may also be mixed with the calcium carbonate and water.

The following examples further illustrate the instant invention.

EXAMPLE I

Four aqueous calcium carbonate slurries are made up by mixing 300 grams of calcium carbonate, prepared by the process disclosed in U.S. Pat. No. 2,964,382, in water at 75% solids along with the components shown in Table I below. These components are mixed with water in a cross-arm sigma blade mixer until complete dispersion is obtained as determined visually and then the dispersion is let down to 70% solids by further addition of water. The total time for mixing and dispersing the 75% solids dispersant plus the time involved in letting down to 70% is a measure of dispersibility of the system and such time in minutes is indicated in Table I below.

TABLE I

| Slurry No. | Percent by weight | | | Total mix time, minutes |
|---|---|---|---|---|
| | Calgon T | Sodium hexameta-phosphate | ZnO | |
| 1 | 1 | 0 | 0 | 14 |
| 2 | 1 | 0 | 0.2 | 8.5 |
| 3 | 0 | 1 | 0 | 14 |
| 4 | 0 | 1 | 0.2 | 9.5 |

From the above, it can be seen that small amounts of zinc oxide substantially improve the dispersion time for slurries employing the conventional dispersants Calgon T and sodium hexametaphosphate.

EXAMPLE II

Calcium carbonate slurries are prepared by mixing 3,000 grams of dry calcium carbonate, prepared in accordance with U.S. Pat. 2,964,382, and previously defined Calgon T dispersant alone and with either ZnO or $ZrO_2$ and a sufficient amount of water to give a 75% solids slurry. The mixtures are agitated with a conventional sigma blade mixer. Following complete addition of the pigment and dispersants, the resultant slurry is allowed to agitate until complete dispersion is achieved as determined visually and then let down to 70% solids by the further addition of water. The amounts of Calgon T dispersant, zinc oxide, and zirconium oxide are shown in Table II below in percent by weight. The viscosity of the 70% calcium carbonate slurry is determined by a Hercules high shear viscometer employing bob No. 2 and the results in dyne centimeters at 500 and 1,000 r.p.m. are set forth in Table II below.

TABLE II

| | Run No. | | |
|---|---|---|---|
| | 1 | 2 | 3 |
| Dispersant | (1) | (1) | (1) |
| Dispersant aid | None | (2) | (3) |
| Total mix time, minutes | 5 | 3.5 | 3.75 |
| Hercules torque, dyne centimeters at r.p.m.: | | | |
| 500 up | 250,000 | 180,000 | 150,000 |
| 500 down | 230,000 | 170,000 | 140,000 |
| 1,000 up | 760,000 | 450,000 | 470,000 |
| 1,000 down | 790,000 | 420,000 | 460,000 |

1 Calgon T (1%).
2 $ZrO_2$ (0.2%).
3 ZnO (0.2%).

The data of Table II illustrate the effectiveness of both zinc oxide and zirconium oxide as dispersant aids for increasing dispersion over that which can be achieved with the conventional dispersant Calgon T alone. Similiar tests were made employing aluminum oxide and titanium dioxide as supplemental dispersants in the manner described above and neither of these dispersants were effective to improve dispersing properties over those obtained with the Calgon T alone. This demonstrates the uniqueness of zinc oxide and zirconium oxide in improving dispersion properties.

EXAMPLE III

Aqueous calcium carbonate slurries are prepared, as described in Example II, employing the components of Table III below as the dispersant materials.

TABLE III

| Slurry No. | Dispersant components | Percent by wt. |
|---|---|---|
| 1 | Ethylene-maleic anhydride copolymer of 1,500–2,000 molecular weight. | 0.6 |
|   | Sodium hexametaphosphate | 0.7 |
|   | ZnO | 0.2 |
| 2 | Ethylene-maleic anhydride copolymer of 1,500–2,000 molecular weight. | 0.2 |
|   | Tetrasodium pyrophosphate | 0.5 |
|   | ZnO | 0.2 |
| 3 | Sodium polyacrylate polymer of 20,000 molecular weight. | 0.5 |
|   | Sodium hexametaphosphate | 0.5 |
|   | ZnO | 0.2 |
| 4 | Sodium polyacrylate polymer of 20,000 molecular weight. | 0.2 |
|   | Sodium hexametaphosphate | 0.2 |
|   | ZnO | 0.2 |
| 5 | Sodium polyacrylate polymer of 60,000–80,000 molecular weight. | 0.3 |
|   | Sodium hexametaphosphate | 0.5 |
|   | ZnO | 0.2 |
| 6 | Sodium polyacrylate polymer of 60,000–80,000 molecular weight. | 0.2 |
|   | Sodium hexametaphosphate | 0.2 |
|   | ZnO | 0.2 |

Excellent dispersions are prepared in all six of the slurries employing the above dispersant components.

EXAMPLE IV

This example illustrates the preparation of dry calcium carbonate pigment in accordance with this invention wherein 156 pounds of calcium carbonate filter cake containing 46% solids, 0.3 pound of zinc oxide, and 1.5 pounds of the previously defined Calgon T dispersant were added to a vessel equipped with a high peripheral speed agitator which employs two rotating discs which have a multiplicity of suitably raised veins or depressed grooves forming a symmetrical radial or arcuate pattern of alternate raised and lowered portions around the impeller discs.

After proper mixing, i.e., for about 10 minutes, 180 pounds of recycled calcium carbonate pigment is added to the slurry and the dispersion mixed until a uniform mixture is obtained which requires about 30 minutes. The amount of recycled pigment added was enough to produce a slurry containing 75% solids. The resultant slurry is dried in a conventional spray dryer. A slurry containing 75% solids and characterized by excellent dispersion is produced from the dried product by simply adding the proper amount of water.

EXAMPLE V

A slurry is prepared, as described in Example II, employing 0.25% by weight sodium tripolyphosphate, 0.4% by weight Calgon T, and 0.2% by weight zinc oxide as the dispersant components whereby excellent dispersion is achieved.

It is to be distinctly understood that various changes and modifications may be made in the foregoing without departing from the spirit of the invention and scope of the appended claims.

What is claimed is:

1. A process for preparing an aqueous calcium carbonate slurry which contains from about 55 to 80% by weight calcium carbonate, comprising mixing calcium carbonate and water with from about 0.05 to 0.5% by weight of a compound selected from the group consisting of substantially pure zinc oxide and zirconium oxide and from about 0.2 to 2% by weight phosphate dispersant material containing from about 50 to 100% by weight complex phosphate.

2. The process of claim 1 wherein said compound is zinc oxide.

3. The process of claim 1 wherein said compound is zirconium oxide.

4. The product produced by the process of claim 1.

5. The process of claim 1 wherein said complex phosphate dispersant material consists of a fused, homogeneous mixture of from about 81 to 88% by weight sodium phosphate glass having a molar ratio of $Na_2O:P_2O_5$ of from about 0.9:1 to about 1.5:1, from about 10 to 15% by weight zinc oxide, and from about 0.5 to 8% by weight of a compound selected from the group consisting of the salt and hydroxide of an alkali metal selected from the group consisting of potassium and lithium.

6. The process of claim 5 wherein sodium tripolyphosphate is also mixed with said calcium carbonate, phosphate dispersant material and water in amount from about 0.2 to 2% by weight, in addition to the amount of phosphate present as a result of the incorporation of said 0.2 to 2% by weight phosphate dispersant material.

7. The process of claim 1 wherein from about 0.05 to 1.5% by weight organic polymer selected from the group consisting of alkali metal polyacrylate polymers and ethylene-maleic anhydride copolymers having a molecular weight of about 1000 to 90,000 is also mixed with said calcium carbonate and water.

8. The process of claim 7 wherein said complex phosphate dispersant material consists of a fused, homogeneous mixture of from about 81 to 88% by weight sodium phopshate glass having a molar ratio of $Na_2O:P_2O_5$ of from about 0.9:1 to about 1.5:1, from about 10 to 15% by weight zinc oxide and from about 0.5 to 8% by weight of a compound selected from the group consisting of the salt and hydroxide of an alkali metal selected from the group consisting of potassium and lithium.

9. An aqueous slurry comprising calcium carbonate in amount from about 55 to 80% by weight of said slurry, water, from about 0.2 to 2% by weight phosphate dispersant material containing from about 50 to 100% by weight complex phosphate, about 0.05 to 1.5% by weight organic polymer selected from the group consisting of alkali metal polyacrylate polymers and ethylene-maleic anhydride copolymers and about 0.05 to 0.5% by weight of a compound selected from the group consisting of zinc oxide and zirconium oxide.

10. A process for preparing dry calcium carbonate pigments which may be easily mixed with water to form slurries suitable for paper coating and other applications comprising the steps of mixing calcium carbonate and water with from about 0.05 to 0.5% by weight of a compound selected from the group consisting of substantially pure zinc oxide and zirconium oxide, and from about 0.2 to 2% by weigt complex phosphate dispersant material containing from about 50 to 100% by weight complex phosphate and drying said mixture.

11. The process of claim 10 wherein the mixture prior to drying contains from about 40 to 50 weight percent calcium carbonate.

12. The process of claim 10 wherein said complex phosphate dispersant material consists of a fused, homogeneous mixture of from about 81 to 88% by weight sodium phosphate glass having a molar ratio of $Na_2O:P_2O_5$ of about 0.9:1 to about 1.5:1, from about 10 to 15% by weight zinc oxide, and from about 0.5 to 8% by weight of a compound selected from the group consisting of the salt and hydroxide of an alkali metal selected from the group consisting of potassium and lithium.

13. The process of claim 10 wherein from about 0.05 to 1.5% by weight organic polymer selected from the group consisting of alkali metal polyacrylate polymers and ethylene-maleic anhydride copolymers is also mixed with said calcium carbonate and water.

14. The process of claim 13 wherein said complex phosphate dispersant material consists of a fused, homogeneous mixture of from about 81 to 88% by weight sodium phosphate glass having a molar ratio of $Na_2O:P_2O_5$ of from about 0.9:1 to 1.5:1, from about 10 to 15% by weight zinc oxide and from about 0.5 to 8% by weight of a compound selected from the group consisting of the salt and hydroxide of an alkali metal selected from the group consisting of potassium and lithium.

References Cited
UNITED STATES PATENTS

| | | | |
|---|---|---|---|
| 2,540,182 | 2/1951 | Albert | 106—308I |
| 2,750,299 | 6/1956 | Hansen Jr. | |
| 2,913,437 | 11/1959 | Johnson | 106—308O |
| 3,006,779 | 10/1961 | Leaf et al. | 106—306 |
| 3,118,782 | 1/1964 | Hoge | 106—306X |
| 3,245,819 | 4/1966 | Eberts | 106—360 |

JAMES E. POER, Primary Examiner

H. M. S. SNEED, Assistant Examiner

U.S. Cl. X.R.

106—308; 162—181; 260—41